United States Patent [19]

Cook et al.

[11] Patent Number: 5,669,233
[45] Date of Patent: Sep. 23, 1997

[54] COLLAPSIBLE AND REUSABLE SHIPPING CONTAINER

[75] Inventors: Sanford L. Cook, Ocean; Joseph N. Villa, Hazlet, both of N.J.

[73] Assignees: TCP Reliable Inc., Edison; Johnson & Johnson, New Brunswick, both of N.J.

[21] Appl. No.: 613,976

[22] Filed: Mar. 11, 1996

[51] Int. Cl.$^6$ .................................................. F25D 3/08
[52] U.S. Cl. ........................................ 62/371; 62/457.2
[58] Field of Search .......................... 62/371, 372, 259.2, 62/457.2, 530

[56] References Cited

U.S. PATENT DOCUMENTS

| | | | |
|---|---|---|---|
| 1,986,263 | 1/1935 | Hatch | 62/371 |
| 2,325,371 | 7/1943 | Clerc | 62/371 |
| 2,400,742 | 5/1946 | Clerc | 62/371 |
| 2,618,937 | 11/1952 | Francis | 62/372 |
| 2,632,311 | 3/1953 | Sullivan | 62/371 |
| 2,989,856 | 6/1961 | Telkes | 62/371 |
| 3,280,586 | 10/1966 | Funakoshi | 62/371 |
| 4,498,312 | 2/1985 | Schlosser | 62/371 |
| 5,546,758 | 8/1996 | Hintermeier | 62/259.1 |

*Primary Examiner*—William Doerrler
*Attorney, Agent, or Firm*—Jonathan B. Schafrann

[57] ABSTRACT

A collapsible and reusable shipping container incorporates a series of inner insulated panels and an outer enclosure. The inner insulated panels possess a series of parallel channels, both horizontally configured along the bottom panel and vertically around the side panels, said panels retaining a plurality of heat sinks. A bottom enclosure and bottom panel is in operative communication with the side panels and outer enclosure, the assemblage retained in a closed condition by a top inner panel and top enclosure. The heat sinks cooperate to maintain constant interior temperatures, while a pallet means allows the packed container to be moved and stored.

2 Claims, 3 Drawing Sheets

COLLAPSIBLE AND REUSABLE SHIPPING CONTAINER

FIELD OF THE INVENTION

The present invention generally relates to collapsible and reusable shipping containers, and more specifically to a shipping container which is collapsible, reusable, maintains its contents within a desired temperature range and is adapted to be used in conjunction with a pallet.

BACKGROUND OF THE INVENTION

With centralized manufacture and distribution of all manner of consumer goods, the correlative requirement necessary to transport those goods has become more complex and demanding. Long distance shipping of pharmaceuticals and other temperature-sensitive products requires specialized containers. Shipping containers must protect their contents from changes in outside temperature. In the case of shipping pharmaceutical products, maintaining constant interior temperature is critical to delivering a safe and efficacious product to the consumer. Hence, there has been an ongoing search for a shipping container that not only preserves its contents within a desired temperature range, but also retains the dimensions and weight standards common to containers for the proposed use. Other desirable features of a shipping container are, the shipping container being collapsible, reusable, and capable of shipping a payload of multiple individual product containers within.

There are vast arrays of cartons and containers designed to ship products over great distances. Most containers are moved, stacked and stored by pallet-assisted conveyances. In the present art, there are many so-called "breakdown" boxes a common container for bulk shipping consumer goods and pharmaceuticals. Breakdown boxes are typically constructed from corrugated cardboard with additional structural support derived from corrugated longitudinal insert members or polymer support struts. Unfortunately, containers of this design, when exposed to changes in outside temperature transmit the temperature change to the products contained therein.

Fully packed cardboard containers, are ungainly and their weight precludes simple maneuvering by hand. As a matter of course, during shipping, the corrugated cardboard containers suffer a series of handling operations related to the alternate transport and storage involves moving the shipping container from a receiving area to a storage area one or more times. Hence, a pallet interface or engagement means is necessary to safely move and place the container by a mechanical means like a forklift.

With environmental vagaries like sudden or prolonged exposure to temperature extremes, encountered during shipping, a shipper suffers the continuing danger of losing the entire shipment. Therefore, temperature preservation within a shipping container has been a longstanding, albeit unsolved, goal in the industry. Obviously, there is a marked advantage in providing a container capable of protecting its payload of labile products within a prescribed temperature range. In an attempt to evolve shipping containers which overcome the recognized problem, people have resorted to both simple and complex solutions. Some containers possess one or more insulating walls or utilize insulation packing in an attempt to maintain the inner environment within critical temperature levels. Other solutions appertain to maintaining a larger refrigerator container, which in turn holds a plurality of shipping containers, at sub-ambient levels by using complex electrical refrigeration systems.

Notwithstanding the use of refrigerated containers, the problem has heretofore remained unsolved. In addition, space and mechanical limitations, imposed by shippers, warehousers and end users alike compound the instant problem. Finally, yet another obstacle is the requirement there is no special handling or manual intervention to preserve temperature parameters.

U.S. Pat. No. 5,125,248 issued to Moser discloses a breakdown container with a bottom means, two L-shaped side walls, a bottom panel, a top panel, a front panel and a top closure means. There are several support trays and inserts which are secured to the panels when readied for shipping. Further this reference discloses the use of polystyrene foam or an aluminum foil to be used for the outside walls and for the inner trays and panels. The resulting assemblage, while creating good insulation properties is devoid of being able to induce a certain temperature profile.

U.S. Pat. No. Re. 33,446 issued to Leavey discloses an insulated box with disparate panels, but without a temperature modifying means, channels to retain heat sinks or a pallet-type interfaces.

U.S. Pat. No. 4,010,865, issued to Wilgus discloses a collapsible container that is fashioned from urethane foam. It is waterproof and provides a heightened insulating quality. It is without a temperature modifying means or pallet interface.

U.S. Pat. No. 3,650,459 issued to Tucker discloses a "breakdown box" to be loaded through a front opening, in combination with a pallet means. The container is not designed to insulate or preserve interior temperatures.

OBJECT AND SUMMARY OF THE INVENTION

The principal object of the present invention is to provide a collapsible and reusable shipping container capable of maintaining its contents at a constant temperature.

Yet another object of the present invention is to provide a temperature controlled shipping container which is of the same overall dimension as containers common to the industry.

Still another object is to utilize inner panels that are adapted to retain a series of heat sinks, said heat sinks cooperating to preserve a constant temperature within the carton.

Another object of the present invention is to provide the user with a kit that has all the necessary parts for constructing the container.

A further object is to provide a shipping container that is easily assembled, dimensionally identical to available containers and once packed requires no further intervention to maintain interior temperature.

Yet another object of the instant invention is to provide a container that is easily assembled and of low cost.

The present invention relates to a shipping container which is collapsible, reusable, and displays the facility to maintain its contents within a particular temperature range. Further, the container is designed to be used in conjunction with a pallet. The insulated container, although constructed from polymers and corrugated cardboard is conceived to maintain its payload at a constant temperature.

The container in accordance with the present invention is constructed from a series of corrugated cardboard and foamed polymer rectilinear panels. When assembled the result is box-like in overall appearance. A bottom enclosure of an essentially square shape of corrugated cardboard has walls which depend upward along its perimeter to form a retention means therearound. Placed within the bottom enclosure is a bottom panel of substantially smaller dimensions. The bottom panel has a plurality of parallel channels retained therein for placement of a plurality of heat sinks. By placing the bottom panel in the bottom unit there is sufficient space to place the other panels.

A like number of foam polymer panels fit within the space created between the bottom enclosure and the bottom panel. A sufficient number of panels are inserted within the space to form, in the preferred embodiment a three-sided enclosure. The foam polymer panels comprise the inner walls. Within the inner panels are parallel and vertically arrayed channels for positioning a plurality of heat sinks. The inner panels overlap and interlock to approximate the conformation of the enclosure. The inner panels are essentially planar and contain a plurality of vertically and parallel spaced channels. A plurality of heat sinks are disposed within the channels and are continuous in one direction along the bottom of the container.

The outer enclosure provides a series of upstanding rectilinear panels foldedly connected to one another along common fold lines to form the outer walls of the enclosure. The panels, joined along a fold line provide a rear panel, two side panels and a pair of retention flaps to define a front area adapted to receive a free standing rectilinear panel. The folded panels are C-shaped in appearance and include two retention flaps.

A front foam panel is positioned after packing of the container with products, followed by a front outside panel. The front panel has a plurality of vertical and parallel channels, retaining a series of heat sinks. The heat sinks are removable and cooperate to maintain temperature parameters. Arranged as a matrix, the channels which may be integral with the inner panels create a series of channels and studs.

The heat sinks are preferably a gel covered in a polymer skin (Cryogel™ TCP Reliable, Inc.). The encased gels may be maintained in a frozen state for maintaining the contents of the shipping container at a sub-ambient temperature. The heat sinks can be maintained in a frozen condition and reused.

A top polymer panel with a corresponding channel and stud assembly fits within the open end of the enclosure. Covering the outside, an essentially rectilinearly-shaped top means with a like number of downward depending flaps fits over the outside surface of the outer panels. The top is of a slightly larger dimension in relation to the open enclosure space and fitting thereover to provide overlapping closure. Further sealing of the container may be effected via shrink wrapping and adjustable retention bands.

BRIEF DESCRIPTION OF THE DRAWINGS

It should be noted that other advantages, objects and features will become apparent when the detailed description is read with reference to the drawings in which.

DETAILED DESCRIPTION

Figure 1:
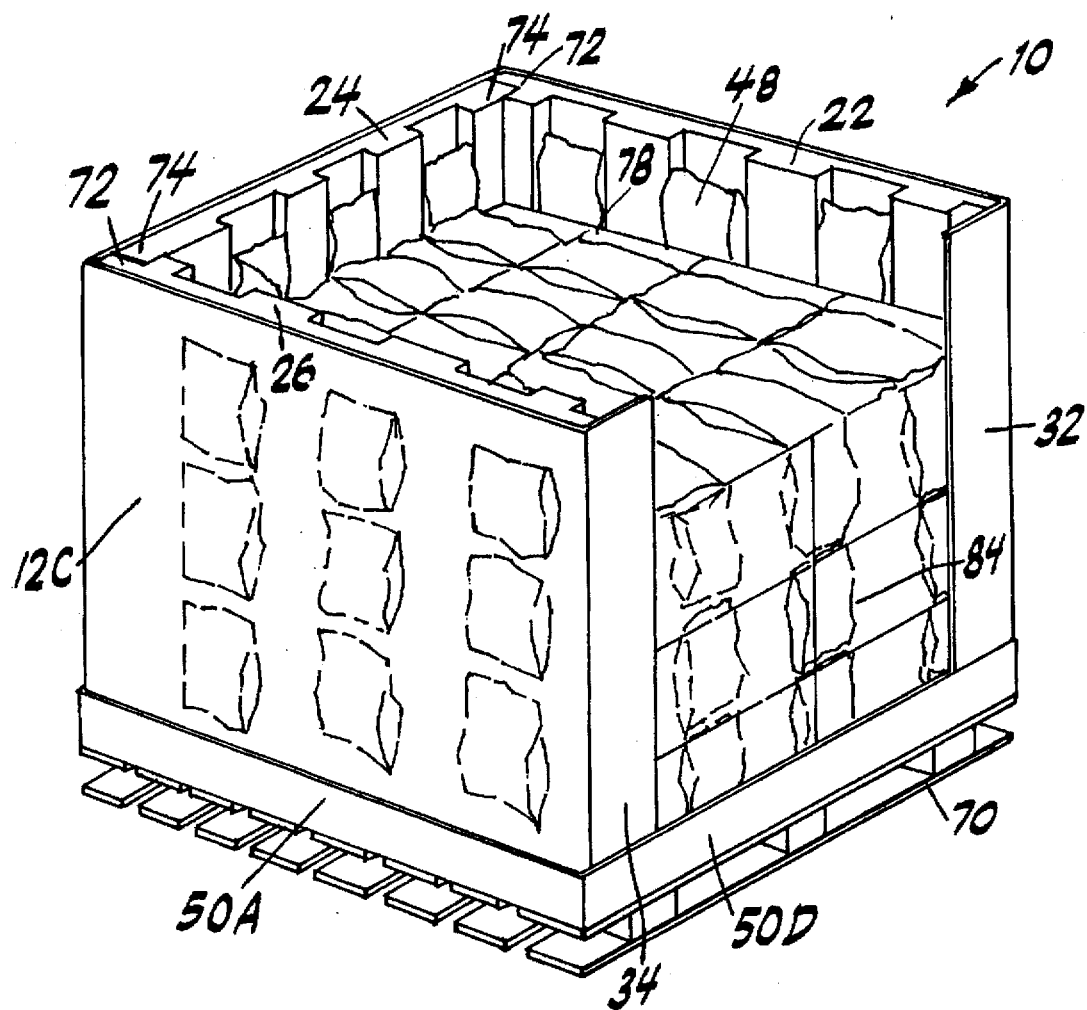
FIG. 1 shows a perspective view of the container in an open and packed condition.
Figure 5:
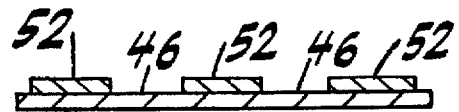
FIG. 5 shows an elevation view of taken along line 5—5 of FIG. 3.

Turning now with more specificity to the drawings, where like numerals refer to like parts throughout, FIG. 1 shows a perspective view of container 10 in an assembled, open and packed condition. For ease of explanation, container 10 will be described in terms of possessing at least two pairs of opposing sides and being rectangular and box-like in overall shape.

Figure 2:
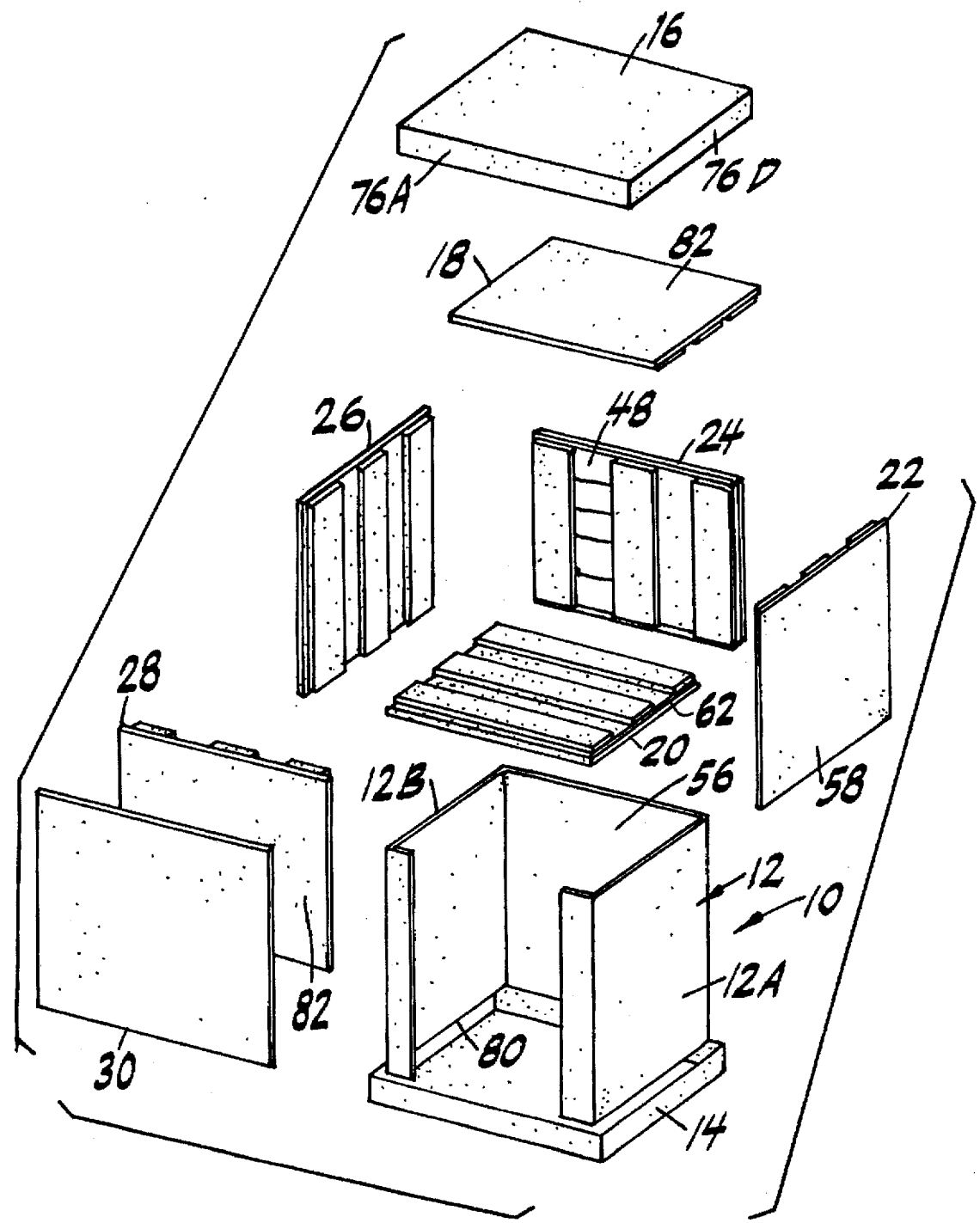
FIG. 2 shows an exploded view thereof the opposing sides being identical.
Figure 3:
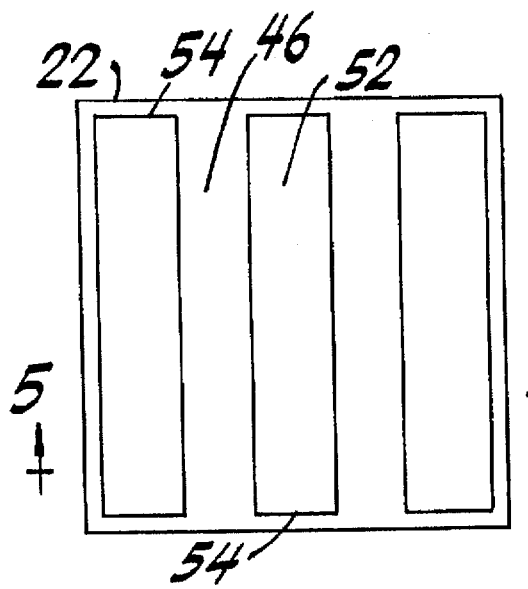
FIG. 3 shows an elevational view of a side panel.

Bottom enclosure 14, as shown in FIG. 2 is essentially square in its preferred embodiment and possesses a like number of upwardly depending walls 50(a)–50(d). Bottom enclosure 14 is adapted to accept bottom panel 20, seating therein. Bottom panel 20 is substantially smaller than bottom enclosure 14 and when seated in bottom panel 20 presents a retention space for panels 22, 24, 26 and 28. Within panel 20 is a plurality of channels 46 arrayed in parallel relation therethrough. It should be noted that it is preferred that all channels enumerated by the numeral 46 are of identical overall width and length dimensions related to the overall dimension of container 10.

Preferably, bottom panel 20 is constructed from a closed cell polymer foam. The seating of bottom panel 20 within bottom enclosure 14 furnishes a base for the construction of shipping container 10. In accordance with FIG. 6, bottom panel 20 is essentially quadrilateral in shape and possesses a plurality of channel means 46 (a)(b). As illustrated by FIG. 1, a preferred embodiment includes bottom enclosure 14 in operative communication with a pallet means 70. Pallets are well known in the art and may be operatively substituted without significant differences.

Figure 6:
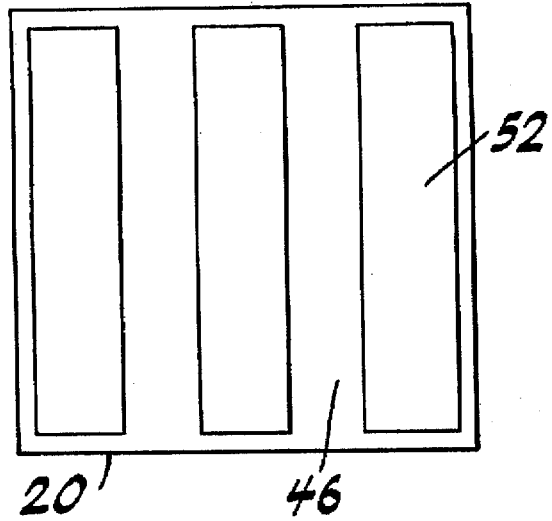
FIG. 6 shows an elevational view of the bottom panel.
Figure 7:
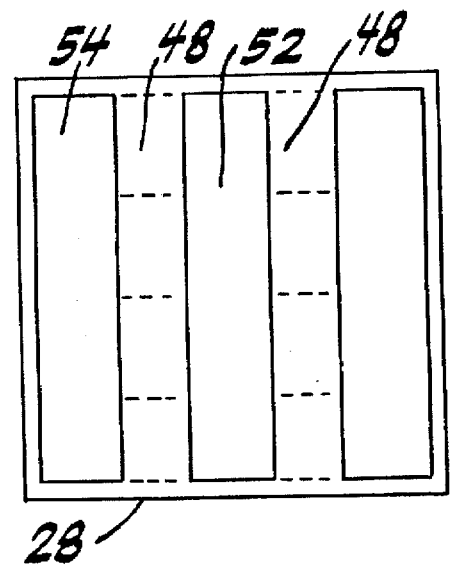
FIG. 7 shows an elevational view of front panel, the opposing rear panel being identical thereof.

In accordance with FIG. 6, bottom panel 20 possesses a series of identically configured channels 46 dimensioned to present a matrix of troughs 78 and studs 52. Channel 46 is defined by upstanding wall 38 of stud body 36 trough 78 upstanding wall 40 of opposing stud body 42. The troughs 78 and studs 52 matrix is adapted to receive a plurality of heat sinks 48 and to provide a retention guide so that the heat sinks 48 remain placed for optimal temperature maintenance. Moreover channels 46 are of a length which is substantially less than the length of bottom panel 20. When bottom panel 20 is disposed within bottom means 14 a retention space 54 arises in peripheral conformation. Said retention space 54 is of an equal dimension on all peripheral sides of each panel 22, 24, 26 and 28. The resulting assemblage permits an interlocking of adjacent panels 22, 24, 26, 28 as illustrated in FIGS. 1 and 2. In the instant invention, the preferred width of peripheral retention area 54 is 1.5 inches. In fact, each panel in accordance with the present invention is configured to present a 1.5 inch peripheral retention space 54 further comprises L-shaped member 72. and rectangular member 74. Said L-shaped member 72 and rectangular block-shaped member 74 abutting interlock and panels 22, 24, 26 and 28 are joined along the vertical abutting surface. Therefore, in constructing a three-sided enclosure, retention space 54 and block-shaped member 72 and L-shaped member 74, of side panels 22, 24 and 26 abut inner surface 54 of bottom panel 20 and lip 80 of inner planar surface 56 of exterior enclosure 12 further retains side panels 22, 24 and 26, while side wall 58 of side panels 22, 24 and 26 communicates with upwardly depending walls 50A–D of bottom enclosure 12. Flat panel side 82 of panels 22, 24, 26 and 28 interlock in the same manner with top panel 18 and are in communication with top surface 60 and downwardly depending walls 76A–D when closed and packed condition. The resulting assemblage, as clearly illustrated in FIGS. 1 and 2 provides an interlocking of side panels 22, 24 and 26 with bottom panel 20 forming an interior insulated enclosure. As illustrated by FIG. 2, the interlocking configuration aligns channels 46 of opposing sides 22 and 26 with channels 46 of bottom panel 20, said channels being continuous therethrough.

Panels 18, 20, 22, 24, 26 and 28 are preferably constructed from an insulating material like a closed cell polymer foam. The preferred closed cell polymer is foamed polystyrene although other closed cell polymers can be operatively substituted. Being constructed of a closed cell polymer is the preferred material, although other insulating polymer and non-polymeric materials may be substituted. Channels 46 are parallel and in the upstanding sides vertically oriented. Said channels 46 are preferably evolved through stock removal. Channels 46 are situated within bottom panel 20 and run parallel therethrough to join vertically oriented channels 46 in opposing side panels 22 and 26, to render continuous U-shaped channels through container 10. Rear panel 24 contains parallel channels 46 arrayed vertically which abut stud surface 42 of bottom panel 20. Channel 46 and stud 52 configurations are adapted to receive heat sinks 48 within trough 78. Front panel 28 and rear panel 24 are shorter than opposing side panels 22 and 26. The opposing panels of container 10 are preferably of equal dimensions.

In the preferred embodiment, and for ease of illustration, bottom panel 20 is of the same dimension as top panel 18 (40⅛ inches in width) and of a larger dimension in respect to opposing side panels 22 and 26. Opposing side panels are of the same size (40 inches in width). Rear panel 24 which forms the back surface opposite the open front is of a smaller dimension than opposing side panels 22 and 26, but is the same dimension as front panel 28 (36 inches in width). Top panel 18 and bottom panel 20 are of the same dimension (40⅛ inches in width) although the stud and channel configuration is quite different.

Returning to FIGS. 1 and 2, once side panels 22, 24 and 26 are upstanding to form a three-sided enclosure, enclosure 12 fits over the flat outer surfaces 82 of the enclosure formed by the joining of said inner panels 22, 24 and 26. Enclosure 12 is essentially planar, and by preference, a piece of corrugated cardboard, folded to produce at least three large panels 12a, 12b, 12c joined along a lateral boundary one to another, and retention flaps 32 and 34. It is preferred that retention flaps 32 and 34 are narrow in comparison with panesl 12a–c. Enclosure 12 forms the outer surface of container 10 and is exterior to panels 22, 24, 26 and 28 located in interior relation thereto.

Channels 46, are adapted to receive heat sinks 48, said heat sinks being in operative communication with the interior insulated enclosure arising from panels 22, 24, 26, and 28 and maintaining the inner atmosphere within desired temperature levels. In the present invention the heat sink is preferably a gel covered in a polymer skin of about the same width as channel 46. Therefore, in accordance with the present invention a rectangular polymer-covered gel packet may be kept at a desired temperature. For example, for sustaining sub-ambient temperatures, the gel packets may be frozen prior to packing. The use of heat sinks in containers in accordance with the art is unusual. Gel-covered units are designed to be frozen or heated and once packed, do not require further handling, manipulation or an outside energy source.

In the preferred embodiment as shown in FIG. 1, there is a plurality of heat sinks 48. Heat sinks 48 provide a media to absorb increases or decreases in temperature. For purposes of the present invention, the preferred heat sink material exhibits a phase change. As a class, phase change materials can absorb tremendous amounts of heat energy in the transition between phases. When maintained in a frozen state, the product of net specific heat and density would represent an inverse logarithmic relationship. For example, once the material which has been in a frozen condition reaches the point of freeze/thaw, the temperature remains substantially constant until complete melting occurs. Maintaining a temperature plateau allows for great amounts of heat to be absorbed at a constant rate, and encourages maintenance of a constant ambient interior container temperature. Therefore, heat sink 48 is preferably fashioned from a phase change material like carboxymethylcellulose gel. This gel has a freezing point of approximately −1° C. In the preferred embodiment, the heat sink is approximately 10 inches in length and weighs approximately two pounds. Other materials for constructing heat sinks are phenols, salts, water, glycols, starches and alcohols.

By utilizing the channels within panels 20 22, 24, 26, and 28, a temperature buffering system results. By disposing heat sinks 48 in channels 46 in parallel relation and in accordance with FIGS. 1 and 2 the array is continuous through the bottom, and over the top of the container. Insertion of heat sinks 48 is accomplished by manual insertion, which allows the user to vary the number, density or phase change material composition of the heat sinks for the intended temperature range. Manual insertion and retrieval of heat sinks 48 illustrate another unique feature relating to the relative associated with using container 10. After placing the desired number of heat sinks 48 through channels 46 of bottom panel 20 container 10 is packed with boxed product 82. The packing of container 10 furnishes the user with a rigid closed trough 78 to retain heat sinks 48 in position.

As more fully depicted in FIG. 1, when heat sinks 48 are immovably disposed in vertical conformation down closed troughs 78 temperature moderation can be obtained through cooperation of modifying forces in all planes within the container. As heat sinks 48 reach the top closed troughs 78 the upstanding end of channel 46 provides a positioning guide over the top of boxed products so that heat sinks 48 can be placed over top in and intersecting pattern. It should be noted that one can pack one layer or multiple layers of boxes by using batting, dummy boxes or the like to account for total inner container spaces.

Front panel 28, in an identical construction and arrangement as rear panel 24 is shorter than side panels 22 and 26 and provides closure to inner the enclosure formed through the cooperation of panels 20, 22, 24, and 26. Channels 46 which are disposed both in vertical and parallel relation, and abut bottom panel 20 ending on stud surface 64. Therefore heat sinks 48 do not encircle the inner space confined within the bottom of container 10. The top of the inner space of container 10 is quite different. Top surface 66 of boxed product 84 forms a foundation for the overlay of a plurality of heat sinks 48. As illustrated in FIG. 1, heat sinks 48 are arranged as extensions of each channel 46. Simply, heat sinks 48 abuttingly inscribe a grid pattern within top area of container 10.

Figure 4:
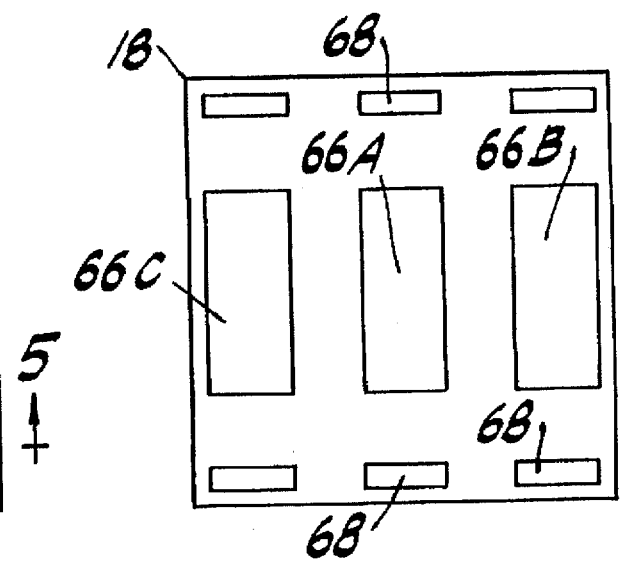
FIG. 4 shows an elevational view of the top panel.

Turning to FIG. 4 top panel 18 is uniquely configured and creates a matrix of studs and channels to accommodate the corresponding grid pattern of abutting heat sinks 48. Top panel 18 is arranged with series of centrally disposed rectangular studs 66a–c and substantially smaller rectangular side studs 68a–68f. This pattern approximates the conformation of intersecting heat sinks 48 and adapted to retain said heat sinks 48 in place during shipping.

It is unique in the art to provide a temperature induction means that is simple to use on many occasions. Other than removing heat sinks 48 for heating or freezing, there is no other interaction by the user.

Top enclosure 16 is larger than bottom enclosure 14 and fits over bottom enclosure 14 to form a smaller box. All components necessary for assembling container 10, in accordance with the present invention, may be retained within the union of said top and bottom enclosures 16 and 14 and can afford the user a kit-type product for easy storage and self-contained assembly.

Other preferred components include the addition of a band means and shrink wrapping to insure that closure and freedom from contamination is maintained. Both banding means and shrink wrapping are well known in the art While the assemblage of individual components is unique, the preferred order of assembly reflects not only differences in panel dimension and for the successful interlocking characteristics of container members, but also an advantage for packing boxed product 84. Bottom enclosure 14 retains bottom foam panel 20 therein and is adapted to provide a foundation for the assembly. Opposing side panels 22 and 26 are the next additions. Rear panel 24 is placed so that a three-sided foam enclosure ensues. To this assemblage a series of heat sinks (Cryogel™ gel packaged in a polymer skin) within channels 46 of bottom panel 20. An essentially C-shaped corrugated cardboard enclosure is fitted within the space between panels 22, 24, and 26 and bottom foam panel 20 and bottom enclosure 14. The user then packs the three-sided space with the desired payload of boxed product 84. When packing rectangular boxed product 84 it is desirable that the short side faces front panel 28. The conformation of the boxes create closure to essentially U-shaped channels 46 resulting in closed troughs 78. A plurality of heat sinks 48 (Cryogel™) reside within the vertically disposed channels. Front foam panel 28 closes the three-sided opening and corrugated cardboard front cover 30 provides closing of the outer covering. Retention flaps 32 and 34 assist in maintaining closure and retain not only exterior front cover 30 but also front panel 28. A plurality of heat sinks 48, as described hereinabove; are placed in the vertically disposed channels within the space created by front panel 28 and boxed product 84. Heat sinks 48 are continued over the top of the product in intersecting rows as depicted in FIG. 1. A foam top panel 18, is placed above intersecting heat sinks 48, the stud and channel configuration of top panel 18 reflecting spaces for heat sink placement. Finally, corrugated cardboard top enclosure 16 is fitted over the assembled container. Preferably, top enclosure 18 is of a dimension which is greater than bottom enclosure 14. When the parts are in an unassembled condition, top enclosure 16 fits over bottom enclosure 18 and retains all parts to container 10 therein. By shrink wrapping the assembled container and securing same with one or more removable bands, the package is in condition for shipping.

While the invention has been particularly described in connection with specific embodiments thereof, it is to be understood that this is by way of illustration and not of limitation, and that the scope of the appended claims should be construed as broadly as the prior art will permit.

What is claimed:

1. A collapsible and reusable shipping container comprising:
   a. a planar exterior bottom piece adapted to receive a bottom panel therein, said bottom panel possessing a plurality of parallel arrayed horizontal channels;
   b. an exterior planar enclosure having at least two opposing side panels joining a rear panel along a vertical abutting surface and surrounding;
   c. a plurality of interior panels, said interior panels possessing a plurality of channels arrayed vertically there within, said interior panels communicating with one another and said bottom panel to form an inner area open on the top and front and closed on the bottom;
   d. a plurality of heat sinks disposed within said horizontal channels of said bottom panel;
   e. a plurality of boxed product packed within said inner area and creating a like number of closed vertical troughs within said plurality of channels arrayed vertically;
   f. a plurality of heat sinks disposed within said closed vertical troughs;
   g. an interior front panel adapted to close the inner area and possessing a plurality of channels arrayed vertically;
   h. an exterior front panel adapted to overlay said interior front panel and being retained thereon by retention flaps;
   i. a plurality of heat sinks disposed within said plurality of vertical channels of said interior front panel;
   j. a plurality of heat sinks disposed over the top of said boxed product in an overlapping configuration, and retained thereon by an interior top panel, said interior top panel possessing a matrix of studs and channels adapted to retain said plurality of overlapping heat sinks; and
   k. a planar lid.

2. A collapsible and reusable shipping container in accordance with claim 1 wherein said exterior enclosure further comprises a plurality of upstanding rectangular panels foldedly connected to each other and disposed at right angles, so that a rear panel is foldedly connected to a side panel on one side, a side panel on the other side, an each side panel is foldedly connected to a retention panel on its lateral boundary, said panels and flaps defining a box-shaped enclosure said enclosure having a top opening, a bottom and a front opening and said front opening being reduced by the width of said retention flaps.

\* \* \* \* \*